US011182970B1

(12) United States Patent
Kathol (10) Patent No.: US 11,182,970 B1
(45) Date of Patent: Nov. 23, 2021

(54) AUGMENTED REALITY AIRCRAFT WINDOW AND METHOD

(71) Applicant: Rockwell Collins, Inc., Cedar Rapids, IA (US)

(72) Inventor: Shawn Kathol, Diamond Bar, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/707,684

(22) Filed: Dec. 9, 2019

(51) Int. Cl.
*G06T 19/00* (2011.01)
*G02B 27/18* (2006.01)
*G02B 27/01* (2006.01)
*B64D 43/00* (2006.01)
*G06F 3/01* (2006.01)
*B60J 3/04* (2006.01)
*B64C 1/14* (2006.01)

(52) U.S. Cl.
CPC .............. *G06T 19/006* (2013.01); *B60J 3/04* (2013.01); *B64C 1/1484* (2013.01); *B64D 43/00* (2013.01); *G02B 27/0101* (2013.01); *G02B 27/18* (2013.01); *G06F 3/012* (2013.01); *G06F 3/013* (2013.01); *G02B 2027/0138* (2013.01)

(58) Field of Classification Search
CPC .. G06T 19/006; G02B 27/0101; G02B 27/18; G02B 2027/0138; B64D 43/00; G06F 3/012; G06F 3/013; B60J 3/04; B64C 1/1484
See application file for complete search history.

(56) References Cited

U.S. PATENT DOCUMENTS 8,116,975 B2 2/2012 Stavaeus et al.
8,686,922 B2 * 4/2014 Breed ............... B60R 21/01536
345/7

(Continued)

FOREIGN PATENT DOCUMENTS

CN 106559651 A 4/2017
EP 2819100 A1 12/2014

(Continued)

OTHER PUBLICATIONS

Dec. 3, 2019, Dubai Air Show, 1 page.
(Continued)

*Primary Examiner* — Michael Le
(74) *Attorney, Agent, or Firm* — Suiter Swantz pc llo (57) ABSTRACT

A system may include an augmented reality (AR) aircraft window. The AR aircraft window may include a transparent emissive display layer, a camera, and a processor communicatively coupled to the transparent emissive display layer and the camera. The processor may be configured to: receive, from an avionics computing device, aircraft data including information of a location, an altitude, a heading, and a bank angle of an aircraft; receive video from the camera; perform head tracking operations to determine a position of at least one of eyes or a head of a user based at least on the video from the camera; generate graphical AR content aligned with the user's view through the AR aircraft window based at least on the aircraft data and performance of the head tracking operations; and output, to the transparent emissive display layer, the graphical AR content when at least one window shader element is transparent.

14 Claims, 7 Drawing Sheets

(56) References Cited

U.S. PATENT DOCUMENTS

| | | | |
|---|---|---|---|
| 9,019,448 B2 * | 4/2015 | Han | G02F 1/133621 |
| | | | 349/114 |
| 9,443,356 B2 | 9/2016 | Kinderman et al. | |
| 10,242,457 B1 | 3/2019 | Sibley | |
| 10,257,582 B2 | 4/2019 | Ramalingam et al. | |
| 10,304,242 B1 | 5/2019 | Tiana et al. | |
| 2008/0021636 A1 * | 1/2008 | Stavaeus | G01C 23/005 |
| | | | 701/408 |
| 2008/0158096 A1 * | 7/2008 | Breed | G01S 7/417 |
| | | | 345/7 |
| 2013/0169807 A1 * | 7/2013 | de Carvalho | H04N 7/183 |
| | | | 348/144 |
| 2014/0232746 A1 | 8/2014 | Ro et al. | |
| 2015/0309316 A1 * | 10/2015 | Osterhout | G06F 3/012 |
| | | | 345/8 |
| 2015/0334336 A1 * | 11/2015 | Chiu | G09G 5/12 |
| | | | 348/383 |
| 2015/0370140 A1 * | 12/2015 | Bertolini | B60J 1/001 |
| | | | 359/275 |
| 2017/0004805 A1 * | 1/2017 | Irzyk | G02B 27/0101 |
| 2017/0200308 A1 | 7/2017 | Nguyen et al. | |
| 2017/0280124 A1 * | 9/2017 | Ahlborn | G06K 9/00832 |
| 2018/0089900 A1 | 3/2018 | Rober et al. | |
| 2018/0182314 A1 * | 6/2018 | Staton | G09G 3/20 |
| 2018/0217429 A1 * | 8/2018 | Busch | G02F 1/076 |
| 2018/0225875 A1 | 8/2018 | Yasrebi | |
| 2018/0254001 A1 * | 9/2018 | Koren | G06Q 50/01 |
| 2019/0080514 A1 | 3/2019 | Nasi et al. | |
| 2019/0325219 A1 | 10/2019 | Lin et al. | |
| 2020/0111259 A1 * | 4/2020 | Sears | G06F 3/012 |

FOREIGN PATENT DOCUMENTS

| | | |
|---|---|---|
| KR | 1020170092009 A | 2/2016 |
| KR | 101905356 B1 | 10/2018 |

OTHER PUBLICATIONS

Aero-Nasch Aviation, "Aircraft Window Shades", EASA European Aviation Safety Agency, printed Dec. 4, 2019, 3 pages.

Lou Martin & Assoc. Inc., "Composite Aircraft Panels and Window Shade Systems", printed Dec. 4, 2019, 1 page.

* cited by examiner

FIG.8 ized image of landmarks visible from above. Additionally, when viewing landmarks on the ground from an aircraft window, the aircraft window being tilted is distracting. Typical head tracking techniques known in the art may have significant latency.

AUGMENTED REALITY AIRCRAFT WINDOW AND METHOD

BACKGROUND

When aircraft passengers look out of aircraft windows, the passengers may not recognize visible landmarks. Additionally, the passengers may wish to know where landmarks obscured by weather or darkness are located.

Additionally, in business jets, designs of side ledges are frequently customized for a buyer with varying shapes and materials used. It can be challenging and expensive to place electronic control devices into the side ledges due to fit, fabrication, and customized electronic cable harness designs.

SUMMARY

In one aspect, embodiments of the inventive concepts disclosed herein are directed to a system. The system may include an augmented reality (AR) aircraft window. The AR aircraft window may include a transparent emissive display layer, a camera, and a processor communicatively coupled to the transparent emissive display layer and the camera. The processor may be configured to: receive, from an avionics computing device, aircraft data including information of a location, an altitude, a heading, and a bank angle of an aircraft; receive video from the camera; perform head tracking operations to determine a position of at least one of eyes or a head of a user based at least on the video from the camera; generate graphical AR content aligned with the user's view through the AR aircraft window based at least on the aircraft data and performance of the head tracking operations; and output, to the transparent emissive display layer, the graphical AR content when at least one window shader element is transparent.

In a further aspect, embodiments of the inventive concepts disclosed herein are directed to a method. The method may include: receiving, by at least one processor of an augmented reality (AR) aircraft window from at least one avionics computing device, aircraft data including information of a location, an altitude, a heading, and a bank angle of an aircraft, wherein the AR aircraft window comprises a transparent emissive display layer, a camera, and the at least one processor communicatively coupled to the transparent emissive display layer and the camera; receiving, by the at least one processor, video from the camera; performing, by the at least one processor, head tracking operations to determine a position of at least one of eyes or a head of a user based at least on the video from the camera; generating, by the at least one processor, graphical AR content aligned with a user's view through the AR aircraft window based at least on the aircraft data and performance of the head tracking operations; and outputting, by the at least one processor to the transparent emissive display layer, the graphical AR content when at least one window shader element is transparent.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to an augmented reality (AR) aircraft window, system, and a method.

In some embodiments, the AR aircraft window may display graphical AR content, which may be visually aligned relative to a head and/or eye position of a user (e.g., a passenger). For example, the graphical AR content may include point of interest (POI) content, such as POI identifiers of landmarks. For example, if a passenger looks out through the AR aircraft window and sees a lake, the AR aircraft window may display a POI identifier of the name of the lake. If the passenger moves his or her head, for example to look at something that is nearly behind the aircraft, the POI identifiers may move with the passenger's head movement and display additional POI identifiers associated with POIs that are now in the passenger's field of view. Additionally, the AR aircraft window may display graphical non-AR content, which may be statically positioned (e.g., such that the displayed position does not change due to user head tracking operations) on the AR aircraft window. For example, such graphical non-AR content may include current time, time to destination, weather at destination, cabin control information, flight information, video, and/or information related to the graphical AR content.

In some embodiments, the AR aircraft window may include an electrochromic layer configured to transition between transparent and opaque, a transparent emissive display layer, a transparent touchscreen layer, and/or at least one processor, as well as other elements disclosed throughout. The electrochromic layer, the transparent emissive display layer, and the transparent touchscreen layer may be implemented in a stack, wherein the transparent emissive display layer may be positioned between the electrochromic layer and the transparent touchscreen layer. The electrochromic layer may be positioned closer to the exterior of the aircraft than the transparent emissive display layer and the transparent touchscreen, and the transparent touchscreen layer may be positioned closer to a passenger than the electrochromic layer and the transparent emissive display layer. In some embodiments, the touch screen layer may be integrated with the emissive display layer. The electrochromic layer may be configured to operate as a window shade to darken the cabin interior and also to darken a background for the transparent emissive display layer such that the transparent emissive display layer may operate as a standard display rather than a transparent AR display. The transparent touchscreen layer may allow for the AR aircraft window to receive touch user inputs for controlling various AR aircraft window operations and/or aircraft operations. In some embodiments, the transparent touchscreen layer may simplify passenger control implementations by reducing and/or eliminating a need for side ledge electronic control devices.

In some embodiments, the AR aircraft window may provide benefits to several stakeholders in the aviation marketplace. For example, the AR aircraft window may provide passengers with new information capabilities (e.g., displaying graphical AR content, such as POIs) and may provide lighting and other cabin controls, flight information, voice interaction with the cabin (which may be a benefit for passengers in interior seats). For example, for original equipment manufacturers (OEMs), the AR aircraft window may reduce visual clutter in the cabin by eliminating displays mounted in the side ledge, as well as eliminating at least some arm mounted displays. Additionally, the AR aircraft windows in the cabin may operate as a lighting and/or video source, and imagery and/or lighting schemes can be synchronized across the AR aircraft windows of the cabin. The AR aircraft window may simplify side ledge designs and cable harness complexity by removing or eliminating equipment typically installed in the side ledge. From a manufacturing and assembly perspective, because aircraft windows have fewer variations than side ledge implementations, the AR aircraft window can reduce manufacturing and part-count complexities.

Figure 1:
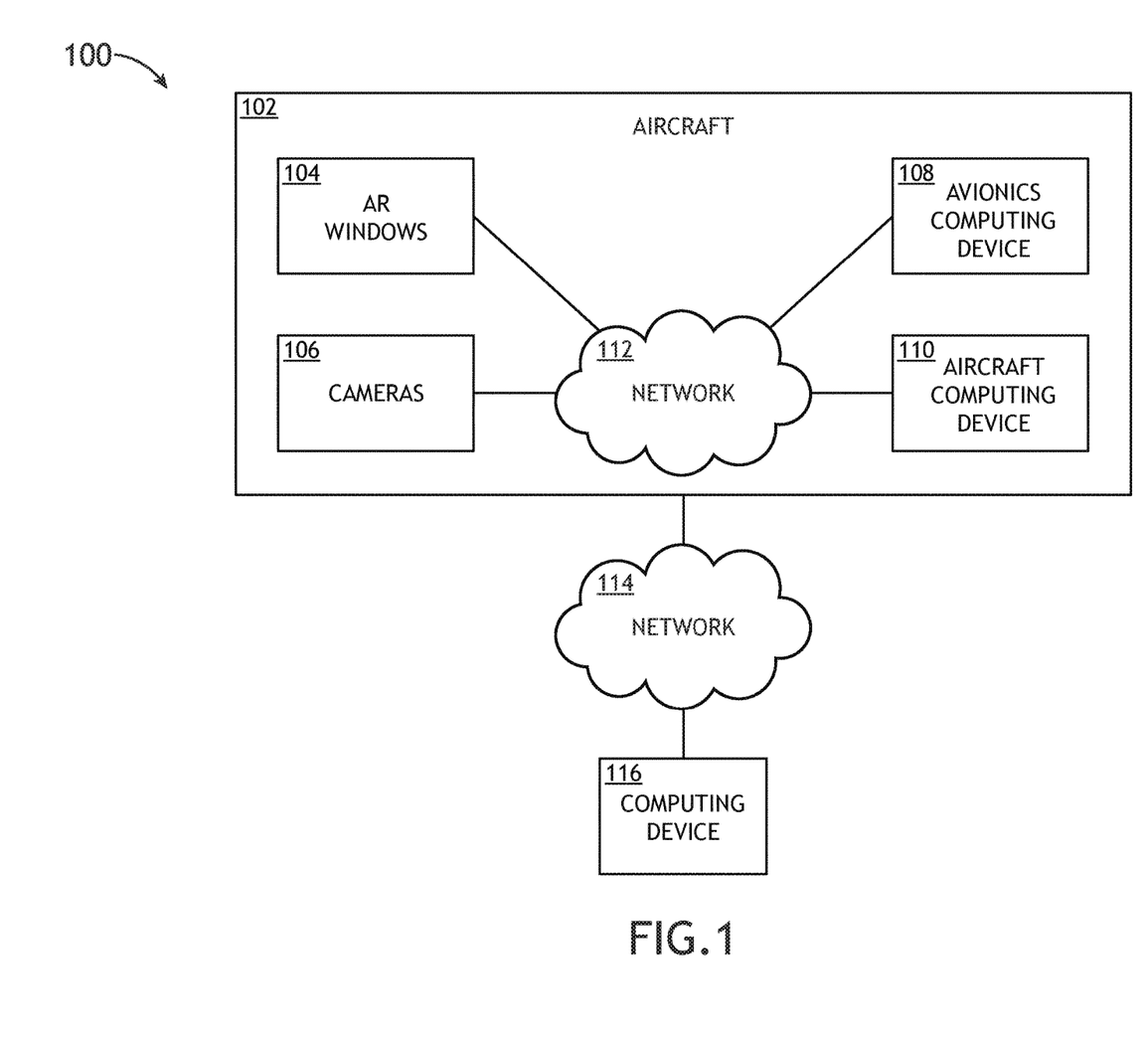
FIG. 1 is a view of an exemplary embodiment of a system according to the inventive concepts disclosed herein.

Referring now to FIGS. 1-6, an exemplary embodiment of a system 100 according to the inventive concepts disclosed herein is depicted. The system 100 may be implemented as any suitable system. For example, as shown in FIG. 1, the system 100 may include at least one vehicle (e.g., aircraft 102), at least one network 114 (e.g., a communications network), and/or at least one computing device 116, some or all of which may be communicatively coupled at any given time.

The aircraft 102 may include at least one AR aircraft window 104, at least one camera 106, at least one avionics computing device 108, at least one aircraft computing device 110, and/or at least one network 112 (e.g., at least one wireless and/or wired aircraft network), some or all of which may be communicatively coupled at any given time. Each camera 106 may be configured to capture video of outside of the aircraft or inside of the aircraft and output the video to the AR aircraft window 104 for presentation to a user.

Figure 2:
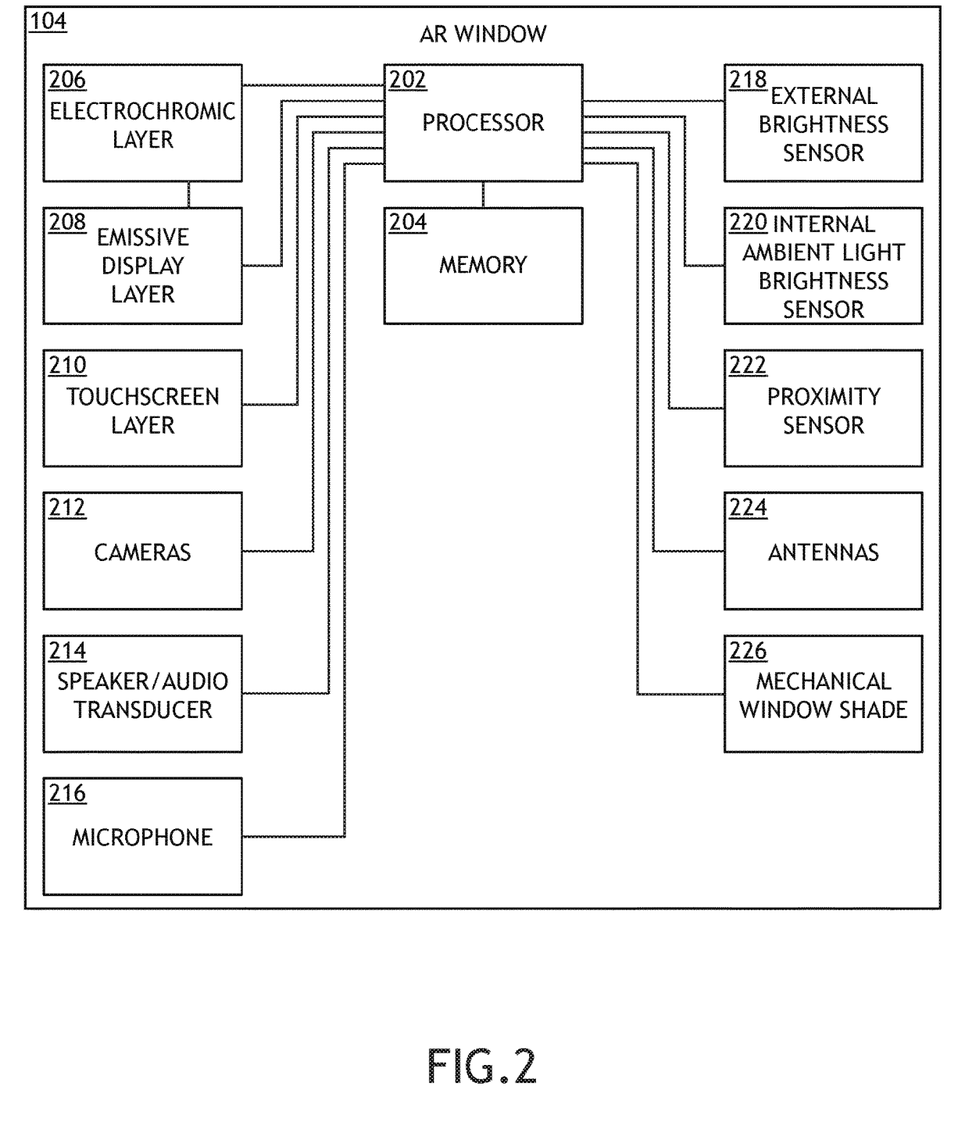
FIG. 2 is a view of an exemplary embodiment of the AR aircraft window of FIG. 1 according to the inventive concepts disclosed herein.
Figure 3:
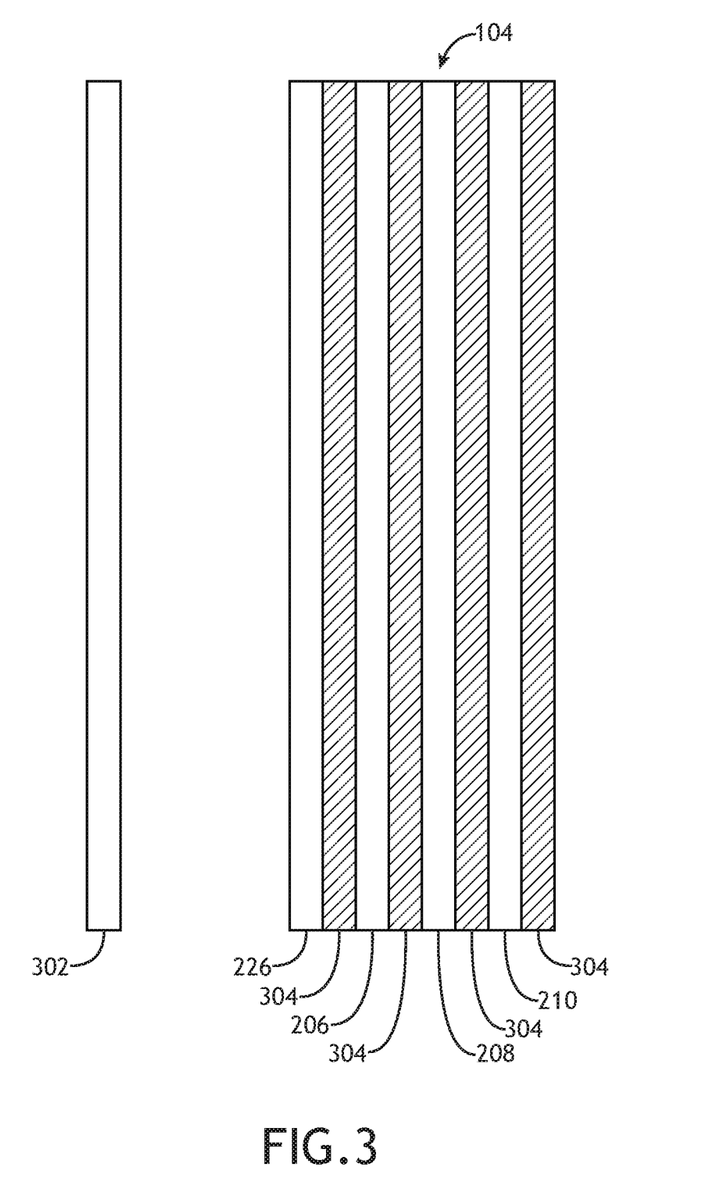
FIG. 3 is a view of an exemplary embodiment of the AR aircraft window of FIG. 1 relative to an exterior aircraft window according to the inventive concepts disclosed herein.

As shown in FIGS. 2-3, each AR aircraft window 104 may include at least one processor 202, at least one memory 204, a window shader element (e.g., at least one electrochromic layer 206 and/or at least one mechanical window shade 226), at least one transparent emissive display layer 208, at least one transparent touchscreen layer 210, at least one structural layer 304, at least one camera 212, at least one speaker and/or audio transducer 214, at least one microphone 216, at least one external brightness sensor 218, at least one internal brightness sensor (e.g., an internal ambient light brightness sensor 220), at least one proximity sensor 222, and/or at least one antenna 224, some or all of which may be communicatively coupled at any given time. As shown in FIG. 3, each AR aircraft window 104 may be installed between an exterior aircraft window 302 (which may be part of the OEM construction of the aircraft 102 and may be an integral part of the pressure vessel) and an interior of the aircraft 102. Each AR aircraft window 104 may be installed as and function as an interior aircraft window. Each AR aircraft window 104 may be implemented as any suitable computing device.

In some embodiments, the at least one window shader element may be implemented as the at least one electrochromic layer 206 and/or the at least one mechanical window shade 226.

For example, the mechanical window shade 226 may be part of the AR window 104; however, in other embodiments, the mechanical window shade 226 may be a separate element installed between the exterior aircraft window 302 and the AR window 104. In some embodiments, the mechanical window shade 226 may be motorized and may include at least one (e.g., two) window shade material (e.g., at least one pleated window shade) configured to transition between open and closed such that the mechanical window shade 226 transitions between transparent and opaque. When the mechanical window shade 226 is open, the mechanical window shade 226 may be considered to be transparent; when the mechanical window shade 226 is closed, the mechanical window shade 226 may be considered to be opaque. In some embodiments, the mechanical window shade 226 may be omitted.

For example, the electrochromic layer 206 may be configured to transition between transparent and opaque. The electrochromic layer 206 may be configured to make the AR aircraft window 104 window transparent or darken (e.g., black out) the AR aircraft window 104 at any given time. In some embodiments, the electrochromic layer 206 may be implemented as a film. The electrochromic layer 206 may serve as both an electronically controlled window shade and a dark background for when the AR aircraft window 104 is used as a standard display. In some embodiments, the electrochromic layer 206 may include independently controllable portions that change opacity independent of other portions. In some embodiments, the electrochromic layer 206 may be omitted.

The transparent emissive display layer 208 may be configured to display graphical content (e.g., graphical AR content and/or graphical non-AR content) on the AR aircraft window 104 for presentation to a user. The transparent emissive display layer 208 may be transparent and emit light when pixels are activated. In some embodiments, the transparent emissive display layer 208 may be implemented as a film. In some embodiments, the transparent emissive display layer 208 may include organic light emitting diodes (OLEDs) and/or electroluminescent (EL) film.

The transparent touchscreen layer 210 may include a touchscreen and may be configured to interface with a user and output touch user inputs to the processor 202. In some embodiments, the transparent emissive display layer 208 may be positioned between the transparent touchscreen layer 210 and the electrochromic layer 206. In some embodiments, the transparent touchscreen layer 210 may include a projected capacitance touchscreen. In some embodiments, the touchscreen may be integrated within another layer, such as the transparent emissive display layer 208.

Each of the structural layers 304 may be positioned between, in front of, and/or behind one or more of the electrochromic layer 206, the transparent emissive display layer 208, and the transparent touchscreen layer 210 such that a stack of laminated layers 206, 208, 210, 304 is formed. The stack of layers 206, 208, 210, 304 may be flat or may be shaped to match a curvature of the interior of the aircraft 102. Each of the structural layers 304 may be formed of any suitable transparent material, such as glass (e.g., Gorilla Glass®) and/or plastic (e.g., acrylic).

The camera 212 may be configured to capture video of an interior of the aircraft 102 and of a user of the AR aircraft window 104. The camera 212 may be configured to output the video to the processor 202. The camera 212 may be one or more narrow or wide-angle cameras and/or range sensor system mounted to a frame of the AR aircraft window 104. The camera 212 may be used to detect a position of the user's head and/or eyes in three-dimensional space near the AR aircraft window 104. In some embodiments, the camera 212 may be used to detect a position of the user's head and/or eyes within one meter of the AR aircraft window 104. Additionally, the camera 212 may be used for video conferencing with others onboard or offboard of the aircraft 102.

The speaker and/or audio transducer 214 may be configured to receive audio from the processor 202 and present audio to a user of the AR aircraft window 104. For example, the speaker and/or audio transducer 214 may be used for voice command responses, outputting safety briefing audio, and/or public address audio. In some embodiments, the audio transducer may be implemented in the AR aircraft window 104 surface.

The microphone 216 may be configured to capture audio of an interior (e.g., a cabin) of the aircraft 102 and of a user of the AR aircraft window 104. The microphone 216 may be configured to output the audio to the processor 202. The microphone 216 may be used for voice commands, voice conferencing, cabin sound reflectometry calibration, and/or ambient noise cancelling operations. Additionally, the microphone 216 and/or the speaker and/or audio transducer 214 may be used for voice control of cabin features and/or for interacting with a voice assistant (e.g., Amazon Alexa or Google Home).

The external brightness sensor 218 may be configured to detect a brightness outside of the aircraft 102 and output the detected brightness to the processor 202. The external brightness sensor 218 may be used to adjust settings for the electrochromic layer 206 and the transparent emissive display layer 208. The external brightness sensor 218 may be used to adjust brightness and display modes of the display augmentations, such as for daytime and nighttime viewing.

The internal brightness sensor (e.g., an internal ambient light brightness sensor 220) may be configured to detect a brightness inside of the aircraft 102 and output the detected brightness to the processor 202. The internal brightness sensor (e.g., an internal ambient light brightness sensor 220) may be used to adjust settings for the electrochromic layer 206 and the transparent emissive display layer 208. The internal brightness sensor (e.g., an internal ambient light brightness sensor 220) may be used to adjust shading modes and display brightness.

The proximity sensor 222 (e.g., an infrared (IR) sensor) may be configured to detect a proximity of a user or a body part (e.g., a hand) of the user relative to the AR aircraft window 104. The proximity sensor 222 may be configured to output a detected proximity to the processor 202. The proximity sensor 222 may be configured to detect hand movement near a bottom of the AR aircraft window 104 in order to trigger user controls to be displayed on the AR aircraft window 104.

The at least one antenna 224 may be configured to communicate (e.g., wirelessly communicate) with other computing devices (e.g., onboard computing devices, such as the avionics computing devices 108, the aircraft computing devices 110, and/or a passenger's mobile computing devices (e.g., a laptop computing device, tablet computing device, and/or phone computing device)). For example, the at least one antenna 224 may be a WiFi antenna and/or a Bluetooth antenna.

The at least one processor 202 may be configured to run various software applications and/or computer code stored (e.g., maintained) in a non-transitory computer-readable medium (e.g., memory 204) and configured to execute various instructions or operations. The at least one processor 202 may be configured to perform (e.g., collectively perform) any or all of the operations disclosed throughout. The at least one processor 202 may be configured to communicate (e.g., wirelessly communicate and/or communicate via wires) with other computing devices (e.g., onboard computing devices, such as the avionics computing devices 108, the aircraft computing devices 110, and/or a passenger's mobile computing devices (e.g., a laptop computing device, tablet computing device, and/or phone computing device)). For example, the at least one processor 202 may be configured to communicate via the at least one antenna 224 and/or via a network interface, which may connect the AR window 104 to the network 112 with a wired interface, such as Ethernet.

For example, the processor 202 may be configured to: control an amount of opacity of the electrochromic layer 206; receive, from at least one avionics computing device 108, aircraft data including information of a location, an altitude, a heading, and a bank angle of an aircraft 102; generate graphical AR content (e.g., AR point of interest (POI) content) aligned with a user's view through the AR aircraft window 104 based at least on the aircraft data; and/or output, to the transparent emissive display layer 208, the graphical AR content when the electrochromic layer 206 is transparent.

For example, the processor 202 may be further configured to output, to the transparent emissive display layer, graphical non-AR content. The graphical non-AR content may include at least one of: cabin control information (e.g., control information of cabin lighting, reading light, and/or temperature), flight information (e.g. time to arrival, a flight path, and/or current location), map information, time information (e.g., a current time), weather information (e.g., weather at current location and/or weather at destination), video, or information related to the graphical AR content (e.g., expanded information about a POI displayed as part of the graphical AR content).

For example, the processor 202 may be further configured to output, to the transparent emissive display layer 208, graphical non-AR content when the electrochromic layer is opaque such that the AR aircraft window 104 may be used as a standard non-AR display. In some embodiments, a processor 202 of a second AR aircraft window 104 may be configured to: output, to a second window transparent emissive display layer 208, second graphical non-AR content synchronized (e.g., synchronized in timing) with the graphical non-AR content of the first AR aircraft window 104 when the second window electrochromic layer 206 is opaque. In some embodiments, graphical non-AR content may be synchronized on any number of AR aircraft windows 104. In some embodiments, multiple AR aircraft windows 104 may synchronously display graphical non-AR content, for example, to display animations and/or ride simulators throughout the aircraft 102.

For example, the processor 202 may be further configured to output, to the transparent emissive display layer 208, a window lighting scheme when the electrochromic layer 206 is opaque. In some embodiments, a processor 202 of a second AR aircraft window 104 may be configured to: output, to a second window transparent emissive display layer 208, a second window lighting scheme synchronized (e.g., synchronized in timing) with the window lighting scheme of the first AR aircraft window 104 when the second window electrochromic layer 206 is opaque. In some embodiments, the window lighting scheme may be synchronized on any number of AR aircraft windows 104. When the AR aircraft window 104 is not transparent for looking out of the aircraft 102, the window lighting scheme may include static, semi-static, and/or dynamic lighting and/or image presentations. For example, window lighting schemes may include: soft color panels, which may match an interior color scheme of the aircraft 102 cabin; woodgrain imagery, which may match wood features of the cabin; any kind of photographs or art; shifting mood lighting, which can also be synchronized with other cabin lighting systems to provide dynamic color and brightness features. In some embodiments, the AR aircraft window 104 may become a full featured accent lighting system, which may be able to create such scenes as soft lighting for reading, dawn and dusk lighting, waking and/or sleep moods, party lighting (e.g., flashing and/or sweep color bursts), flickering candles at a dinner table, and/or a fireplace with crackling sounds. The window lighting scheme may be coordinated with existing color changing lighting systems.

For example, the processor 202 may be further configured to: receive video from the camera 212; perform head tracking operations to determine a position of at least one of eyes or a head of the user based at least on the video from the camera 212; and position the graphical AR content on the transparent emissive display layer 208 based at least on the aircraft data and performance of the head tracking operations. Performance of the head tracking operations may include recognizing object(s) (e.g., a head, eye(s), and/or a nose) and tracking such objects. For example, the camera 212 and/or processor 202 may utilize basic object recognition software to identify and track the location of the head and/or eyes near the AR aircraft window 104. In some embodiments, face tracking and eye tracking (e.g., what the eye is looking at) may not be necessary; rather, a center point position of the person (e.g., a bridge of the nose) can be used. In some embodiments, performance of the head tracking operations may select a single person if multiple heads are in range of the camera 212. The transparent emissive display layer 208 may present graphical AR content which is in visual alignment between the user's eyes and locations on the ground outside of the aircraft 102. As the user moves their head in any direction and as the aircraft 102 progresses in flight, a correct location on the transparent emissive display layer 208 for the graphical AR content updates in real time. In some embodiments, performance of the head tracking operations may select a single person if multiple heads are in range of the camera 212, such as based on the user closest to the AR aircraft window 104 and/or the user closest to perpendicular to the AR aircraft window 104. In some embodiments, where there are two users in range of the camera 212, some graphical AR content can be presented on the AR aircraft window 104 which would apply to multiple simultaneous viewers; for example, if a large lake nearly fills the screen, a label for the lake can be positioned on the screen without concern for the difference in parallax of the viewers.

For example, the processor 202 may be further configured to receive at least one user input from the transparent touchscreen layer 210. For example, the processor 202, based at least on the at least one user input, may be further configured to at least one of: change the amount of opacity of the electrochromic layer 206; output, to the transparent emissive display layer 208, at least one of cabin control information, flight information, weather information, video, or information related to the graphical AR content; output an instruction to change cabin controls (e.g., adjust lighting settings, adjust temperature, and/or adjust a reading light);

change a window lighting scheme; establish at least one of a video conference or an audio conference with another user onboard or offboard of the aircraft 102; display expanded information about a POI; and/or call an attendant.

For example, the processor 202 may be further configured to at least one of: receive at least one user voice input via the microphone 216; establish at least one of a video conference or an audio conference with another user onboard or offboard of the aircraft 102; calibrate cabin sound reflectometry; and/or perform ambient noise cancelling operations.

For example, the processor 202 may be further configured to at least one of: adjust a brightness of the graphical AR content based at least on a detected brightness outside of the aircraft 102; and/or adjust a brightness of the transparent emissive display layer 208 based at least on at least one brightness detected by at least one of the external brightness sensor 218 or the internal brightness sensor (e.g., 220).

Figure 4:
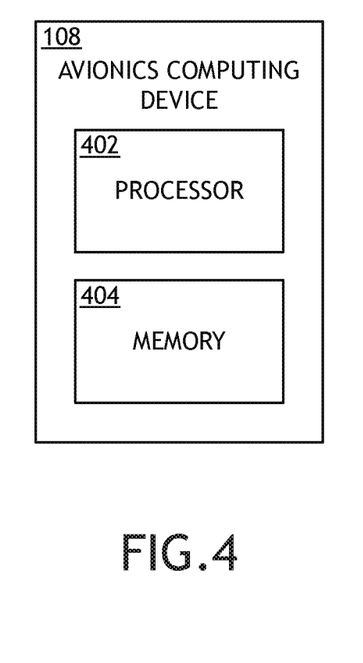
FIG. 4 is a view of an exemplary embodiment of the avionics computing device of FIG. 1 according to the inventive concepts disclosed herein.

As shown in FIG. 4, the avionics computing device 108 may be implemented as any suitable avionics computing device, such as a flight management system (FMS) computing device. The avionics computing device 108 may include at least one processor 402 and/or at least one memory 404, some or all of which may be communicatively coupled at any given time. The processor 402 may be configured to run various software applications (e.g., an FMS application) or computer code stored (e.g., maintained) in a non-transitory computer-readable medium (e.g., memory 404) and configured to execute various instructions or operations. The processor 402 may be configured to perform any or all of the operations disclosed throughout. For example, the processor 402 may be configured to output aircraft data including information (e.g., current information) of a location, an altitude, a heading, and a bank angle of the aircraft 102 to the processor 202.

Figure 5:
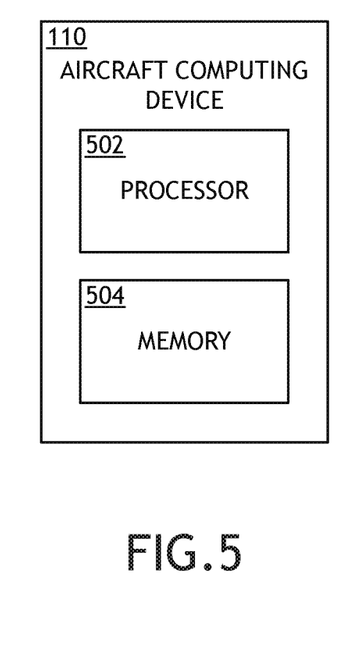
FIG. 5 is a view of an exemplary embodiment of the aircraft computing device of FIG. 1 according to the inventive concepts disclosed herein.

As shown in FIG. 5, the aircraft computing device 110 may be implemented as any suitable aircraft computing device, such as a cabin controls computing device. The aircraft computing device 110 may include at least one processor 502 and/or at least one memory 504, some or all of which may be communicatively coupled at any given time. The processor 502 may be configured to run various software applications (e.g., a cabin controls application) or computer code stored (e.g., maintained) in a non-transitory computer-readable medium (e.g., memory 504) and configured to execute various instructions or operations. The processor 502 may be configured to perform any or all of the operations disclosed throughout. For example, the processor 502 may be configured to: receive instructions from the AR aircraft window 104 to change cabin controls (e.g., to adjust cabin lighting and/or adjust a temperature); and/or adjust cabin controls based on the instructions.

Figure 6:
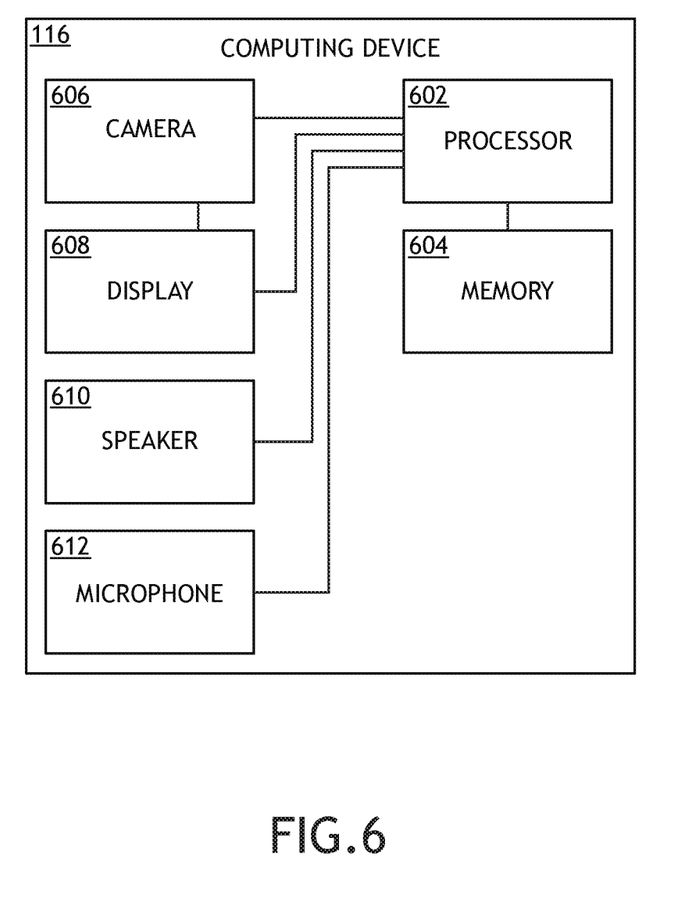
FIG. 6 is a view of an exemplary embodiment of the computing device of FIG. 1 according to the inventive concepts disclosed herein.

As shown in FIG. 6, the computing device 116 may be implemented as any suitable computing device, such as desktop computing device or a mobile computing device (e.g., a laptop computing device, a tablet computing device, and/or a phone computing device). The computing device 116 may include at least one processor 602, at least one memory 604, at least one camera 606, at least one display 608, at least one speaker 610, and/or at least one microphone 612, some or all of which may be communicatively coupled at any given time. The processor 602 may be configured to run various software applications or computer code stored (e.g., maintained) in a non-transitory computer-readable medium (e.g., memory 604) and configured to execute various instructions or operations. The processor 602 may be configured to perform any or all of the operations disclosed throughout. For example, the processor 602 may be configured to: establish at least one of an audio or video conference with the AR aircraft window 104.

At least one processor (e.g., the at least one processor 202, the at least one processor 402, the at least one processor 502, and/or the at least one processor 602) of the system 100 may be configured to perform (e.g., collectively perform) any or all of the operations disclosed throughout.

Figure 7:
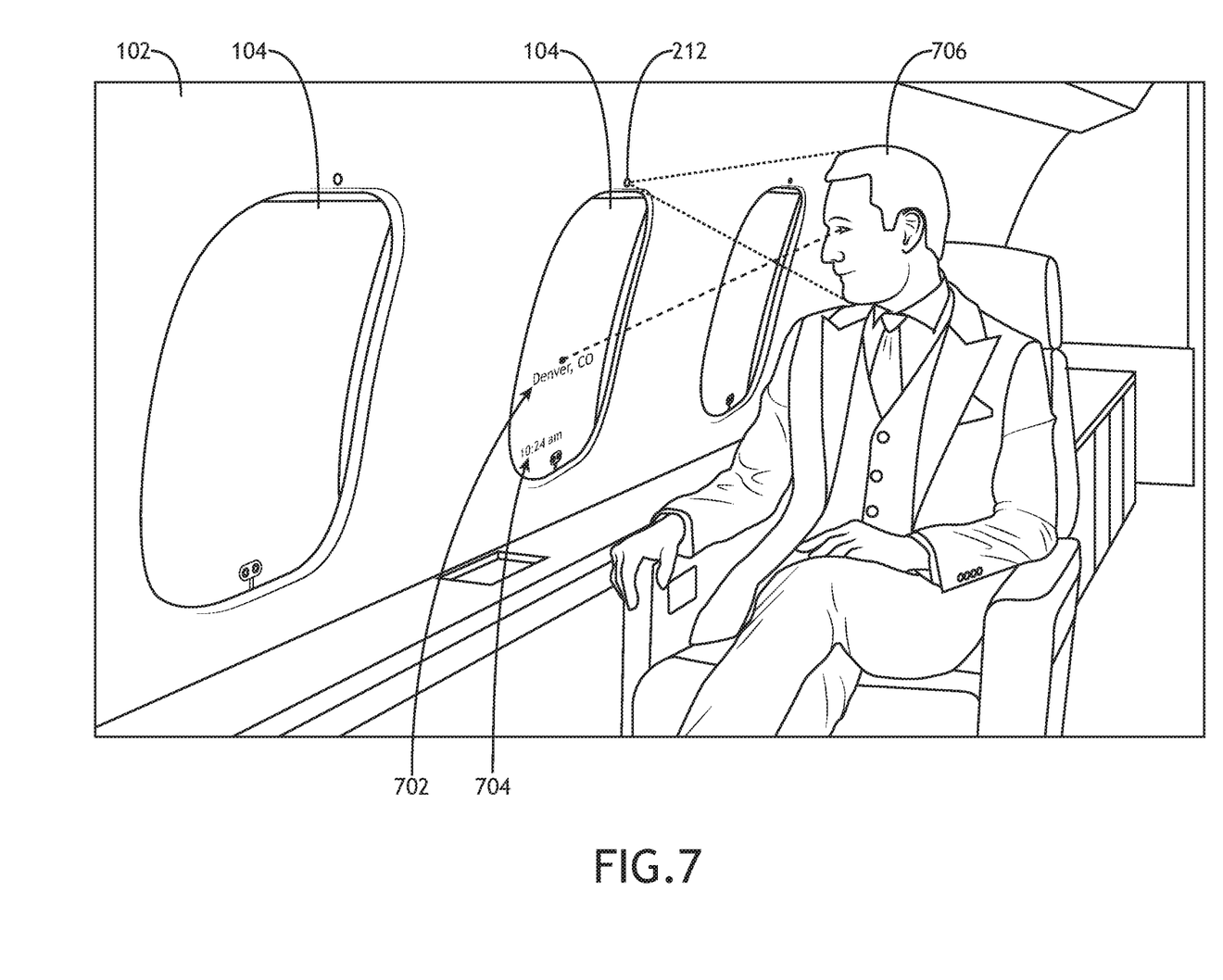
FIG. 7 a view of a cabin of the aircraft of FIG. 1 of an exemplary embodiment according to the inventive concepts disclosed herein.

Referring now to FIG. 7, a view of a cabin of the aircraft 102 of FIG. 1 of an exemplary embodiment according to the inventive concepts disclosed herein is depicted. The cabin of the aircraft 102 may include a plurality of AR aircraft windows 104. As shown in FIG. 7, a user (e.g. a passenger) may interface with the AR aircraft window 104 and view dynamically positioned graphical AR content 702 (e.g., POI content, such as a city identifier) and statically positioned graphical non-AR content 704 (e.g., a time) while viewing through the AR aircraft window 104. The graphical AR content and the graphical non-AR content may be displayed by the transparent emissive display layer 208 when the electrochromic layer 206 is transparent. The graphical AR content may be aligned with the user's field of view and may move as the user moves his or her head 706 based on performance of head tracking operations by the processor 202.

Figure 8:
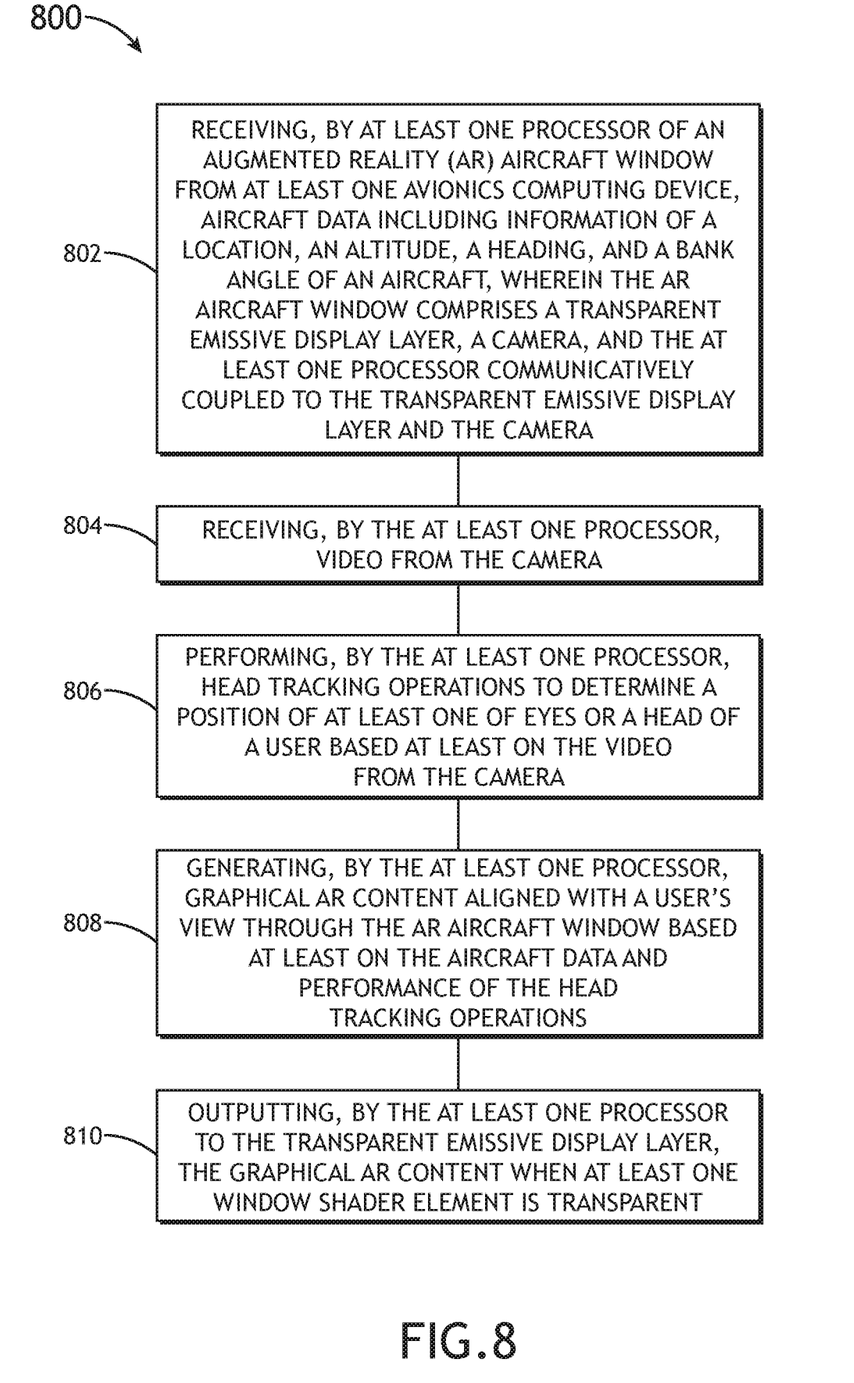
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include receiving, by at least one processor of an augmented reality (AR) aircraft window from at least one avionics computing device, aircraft data including information of a location, an altitude, a heading, and a bank angle of an aircraft, wherein the AR aircraft window comprises a transparent emissive display layer, a camera, and the at least one processor communicatively coupled to the transparent emissive display layer and the camera.

A step 804 may include receiving, by the at least one processor, video from the camera.

A step 806 may include performing, by the at least one processor, head tracking operations to determine a position of at least one of eyes or a head of a user based at least on the video from the camera.

A step 808 may include generating, by the at least one processor, graphical AR content aligned with a user's view through the AR aircraft window based at least on the aircraft data and performance of the head tracking operations.

A step 810 may include outputting, by the at least one processor to the transparent emissive display layer, the graphical AR content when at least one window shader element is transparent.

Further, the method 800 may include any of the operations disclosed throughout.

As will be appreciated from the above, embodiments of the inventive concepts disclosed herein may be directed to an AR aircraft window, system, and a method.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    an augmented reality (AR) aircraft window, comprising:
        a transparent emissive display layer;
        at least one camera configured to capture video of an interior of an aircraft and of a user of the AR aircraft window;
        at least one window shader element, wherein the at least one window shader element comprises an electrochromic layer;
    an external brightness sensor configured to detect an external brightness outside of the aircraft;
    an internal brightness sensor configured to detect an internal brightness inside of the aircraft; and
    at least one processor communicatively coupled to the transparent emissive display layer, the at least one window shader element, the external brightness sensor, the external brightness sensor, and the at least one camera, wherein the at least one processor is configured to:
        receive, from at least one avionics computing device, aircraft data including information of a location, an altitude, a heading, and a bank angle of the aircraft;
        receive the video from the at least one camera;
        perform head tracking operations to determine a position of at least one of eyes or a head of the user based at least on the video from the at least one camera;
        adjust a brightness of the transparent emissive display layer based at least on the external brightness detected by the external brightness sensor and the internal brightness detected by the internal brightness sensor;
        adjust at least one setting of the electrochromic layer based at least on the external brightness detected by the external brightness sensor and the internal brightness detected by the internal brightness sensor;
        generate graphical AR content aligned with the user's view through the AR aircraft window based at least on utilization of the information of the location, the altitude, the heading, and the bank angle of the aircraft and performance of the head tracking operations; and
        output, to the transparent emissive display layer, the graphical AR content when the at least one window shader element is transparent.

2. The system of claim 1, wherein the at least one processor is further configured to: output, to the transparent emissive display layer, graphical non-AR content.

3. The system of claim 2, wherein the graphical non-AR content comprises at least one of: weather information or information related to the graphical AR content.

4. The system of claim 1, wherein the at least one processor is further configured to: output, to the transparent emissive display layer, graphical non-AR content when the at least one window shader element is opaque.

5. The system of claim 4, further comprising a second AR aircraft window comprising a second window transparent emissive display layer and at least one second window processor communicatively coupled to the second window transparent emissive display layer, wherein the at least one second window processor is configured to: output, to the second window transparent emissive display layer, second graphical non-AR content synchronized with the graphical non-AR content of the AR aircraft window when at least one second window shader element is opaque.

6. The system of claim 1, wherein the at least one processor is further configured to: output, to the transparent emissive display layer, a window lighting scheme when the at least one window shader element is opaque.

7. The system of claim 6, further comprising a second AR aircraft window comprising a second window transparent emissive display layer and at least one second window processor communicatively coupled to the second window transparent emissive display layer, wherein the at least one second window processor is configured to: output, to the second window transparent emissive display layer, a second window lighting scheme synchronized with the window lighting scheme of the AR aircraft window when at least one second window shader element is opaque.

8. The system of claim 1, wherein the AR aircraft window further comprises a transparent touchscreen communicatively coupled to the at least one processor, wherein the at least one processor is further configured to: receive at least one user input via the transparent touchscreen.

9. The system of claim 8, wherein the at least one processor, based at least on the at least one user input, is further configured to: output, to the transparent emissive display layer, at least one of weather information or information related to the graphical AR content.

10. The system of claim 1, wherein the AR aircraft window further comprises a microphone and at least one of a speaker or an audio transducer, wherein the at least one processor is further configured to perform ambient noise cancelling operations.

11. The system of claim 10, wherein the at least one processor is further configured to calibrate cabin sound reflectometry.

12. The system of claim 1, wherein the AR aircraft window further comprises a proximity sensor.

13. The system of claim 1, wherein the graphical AR content includes point of interest (POI) content.

14. A method, comprising:
   receiving, by at least one processor of an augmented reality (AR) aircraft window from at least one avionics computing device, aircraft data including information of a location, an altitude, a heading, and a bank angle of an aircraft, wherein the AR aircraft window comprises a transparent emissive display layer, at least one camera configured to capture video of an interior of the aircraft and of a user of the AR aircraft window, at least one window shader element comprising an electrochromic layer, an external brightness sensor configured to detect an external brightness outside of the aircraft, an internal brightness sensor configured to detect an internal brightness inside of the aircraft, and the at least one processor communicatively coupled to the transparent emissive display layer, the at least one window shader element, the external brightness sensor, the external brightness sensor, and the at least one camera;
   receiving, by the at least one processor, the video from the at least one camera;
   performing, by the at least one processor, head tracking operations to determine a position of at least one of eyes or a head of the user based at least on the video from the at least one camera;
   adjusting, by the at least one processor, a brightness of the transparent emissive display layer based at least on the external brightness detected by the external brightness sensor and the internal brightness detected by the internal brightness sensor;
   adjusting, by the at least one processor, at least one setting of the electrochromic layer based at least on the external brightness detected by the external brightness sensor and the internal brightness detected by the internal brightness sensor;
   generating, by the at least one processor, graphical AR content aligned with a user's view through the AR aircraft window based at least on utilization of the information of the location, the altitude, the heading, and the bank angle of the aircraft and performance of the head tracking operations; and
   outputting, by the at least one processor to the transparent emissive display layer, the graphical AR content when the at least one window shader element is transparent.

* * * * *